United States Patent [19]

Sugiyama

[11] Patent Number: 5,526,247
[45] Date of Patent: Jun. 11, 1996

[54] VEHICULAR LAMP HAVING IMPROVED UNIFORMITY OF LIGHT EMISSION

[75] Inventor: Tatsuro Sugiyama, Shizuoka, Japan

[73] Assignee: Koito Manufacturing Co., Ltd., Tokyo, Japan

[21] Appl. No.: 366,916

[22] Filed: Dec. 30, 1994

[30] Foreign Application Priority Data

Dec. 30, 1993 [JP] Japan ................ 5-075502 U

[51] Int. Cl.$^6$ ............................................. F21V 7/00
[52] U.S. Cl. ..................... 362/268; 362/297; 362/328; 362/61
[58] Field of Search ........................ 362/61, 227, 268, 362/297, 296, 327, 328, 331

[56] References Cited

U.S. PATENT DOCUMENTS 4,855,877  8/1989  Otaka ............................ 362/61
5,287,101  2/1994  Serizawa ........................ 362/61

*Primary Examiner*—Carroll B. Dority
*Attorney, Agent, or Firm*—Sughrue, Mion, Zinn, Macpeak & Seas

[57] ABSTRACT

In a lamp for an automobile in which the front opening edge of a lamp housing is covered with front lenses or outer lenses to form lamp chambers for accommodating therein bulbs serving as light sources. An inner lens is provided inside the front lenses or the outer lenses, and a diffusion reflection layer fabricated by roughening processing or the like is formed particularly on a part of an outer peripheral surface of a flange portion of the inner lens or the entire outer peripheral surface thereof. Light emitted by the bulb is irregularly reflected by the diffusion/reflection layer so as to prevent a portion higher in brightness than other portion from appearing in the light emitting planes of the front lenses or the outer lenses.

14 Claims, 4 Drawing Sheets

VEHICULAR LAMP HAVING IMPROVED UNIFORMITY OF LIGHT EMISSION

BACKGROUND OF THE INVENTION

The present invention generally relates to a vehicular lamp having an improved lens structure mounted over the front opening of a lamp housing. More specifically, the present invention is directed to a light diffusion reflecting structure provided at a flange portion of the lens adjacent an inner wall of the opening of a lamp chamber formed within the lamp housing.

Conventionally, a reflection-type arrangement is employed in lamps for automotive use including a so-called combination lamp in which a back-up lamp and a tail and stop lamp are arranged parallel to one another.

As shown in FIG. 6, in a typical reflection-type lamp, light sources 53 (bulbs) are arranged within lamp chambers 51, positioned in front of reflectors 52 provided at the rear portions of the respective lamp chambers 51. The lamp chambers 51 are separated and segmented by a segment wall 50.

In a combination lamp of the reflection type, front lenses or outer lenses 55 cover the opening of a lamp housing 54. Further, inner lenses 56 are provided for achieving certain lighting effects such as a desired color and light distribution, depending upon whether the particular lamp is to be used as a tail and stop lamp, back-up lamp, etc. The inner lenses 56 are arranged parallel to the outer lenses 55 to the rear thereof. In this arrangement, light radiated from the light source 53 is reflected by the reflector 52 and also transmitted through an inner lens 56, thereby to obtain an output light distribution in accordance with the intended purpose of the lamp.

In such a conventional combination-type lamp, a fixing groove 59 is provided integrally at the peripheral portion of the lamp housing 54, and a seal leg portion 57 for the front lens or the outer lens 55 is fitted into the groove and fixed therein by an adhesive 58 or the like. The inner lens 56 is positioned inside the front lens or the outer lens, arranged parallel thereto. The flange portion 60 formed on the peripheral portion of the inner lens 56 so as to extend rearward is adhered along the inner wall of the opening portion of the lamp housing 54. Otherwise, the flange portion 60 may be disposed so as to be movable in the front and rear direction by a guide structure (not shown).

In the thus-constructed conventional lamp, some of the light L2 emitted by the light source 53 is reflected by the flange portion 60 at the peripheral portion of the inner lens 56. Also, some of the light L2 emitted by the light source 53 is transmitted through the flange portion 60 and reflected by the inner surface of the lamp housing 54. The reflected light beam is projected through the front lens or the outer lens 55. As a result, the flange portion is brightened so as to appear lighter than other portions because the reflected light beam is superimposed on the light beam L1 reflected from the reflector 52. Accordingly, the conventional lamp has a problem that the output light beam emitted through the front lens or the outer lens 55 of the lamp is not uniform, thereby causing the lamp to have a generally poor outer appearance when lit.

SUMMARY OF THE INVENTION

The present invention has been made so as to eliminate the above-described problem of the conventional vehicular lamp, and therefore has as an object the provision of a vehicular lamp capable of preventing nonuniform portions from appearing in the light-emitting plane of the front lens or the outer lens by reflecting light irradiated onto the flange portion of an inner lens or the inner surface of the lamp housing in a properly diffused manner, thereby obtaining a much more uniform output light beam and providing the lamp with an improved outer appearance when lit.

To achieve the above-described object, according to one aspect of the present invention, there is provided a lamp for an automobile wherein a front opening of a lamp housing is covered with a lens with the peripheral portion of the lens fitted into a peripheral edge of the portion of the lamp housing around a front opening thereof, characterized in that a diffusion/reflection layer fabricated by a roughening process or the like is formed on either the entire outer peripheral surface or a partial outer peripheral surface of a flange portion of the lens.

The above-described diffusion/reflection layer or structure is fabricated on the flange portion of the inner lens or the inner wall of the opening portion of the lamp housing.

According to the thus-constructed vehicular lamp, both light emitted from the light source and directed to the flange portion of the inner lens as well as light directed to the inner surface of the lamp housing through the flange portion is reflected in a diffused manner by the diffusion/reflection structure formed on the flange portion or the inner wall of the opening portion of the lamp housing. Thus, reflected light irradiated onto the diffusion/reflection structure is distributed thereby, thus preventing some portions of the front lens and the outer lens from being brighter than other portions. As a consequence, the lamp emits light uniformly over the entire surface thereof, thereby improving the outer appearance of the lamp when lit.

DESCRIPTION OF THE PREFERRED EMBODIMENTS

Figure 1:
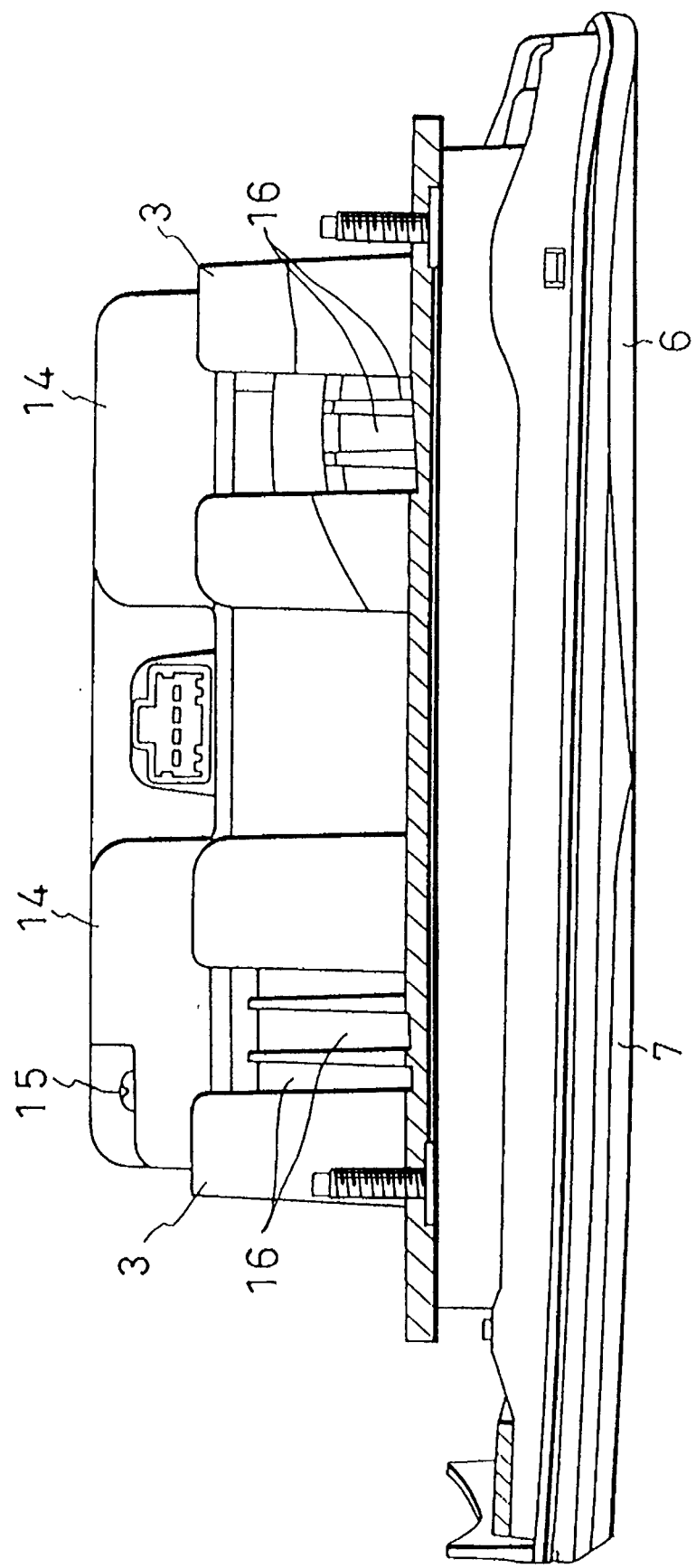
FIG. 1 is a plan view showing a vehicular lamp constructed according to a preferred embodiment of the present invention.
Figure 2:
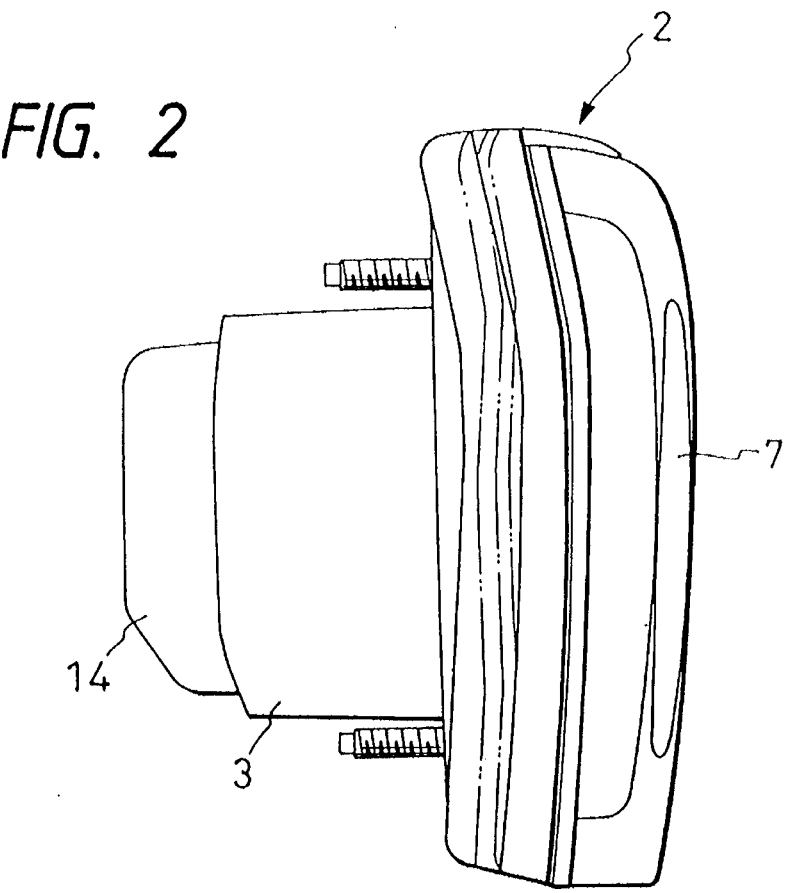
FIG. 2 is a side view showing the lamp of FIG. 1.
Figure 4:
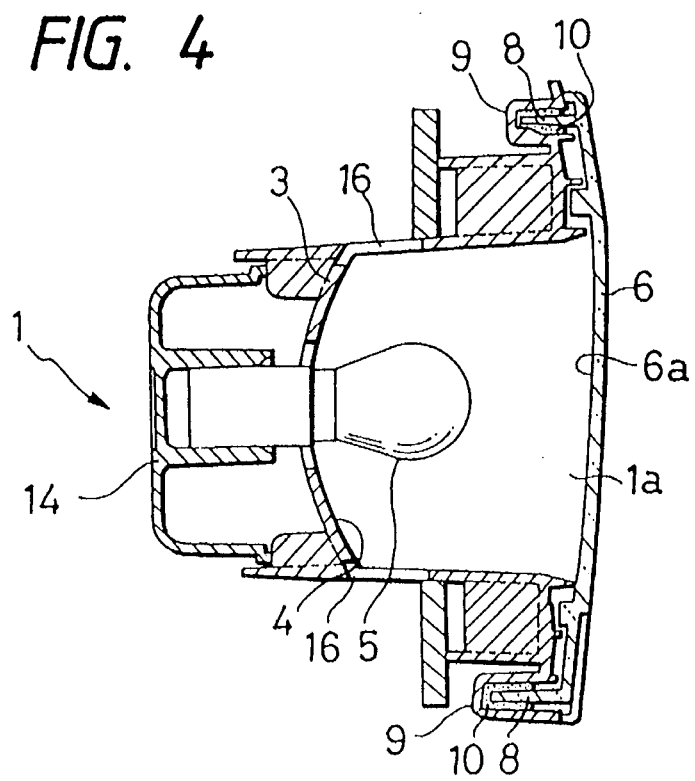
FIG. 4 is a longitudinal sectional view showing a back-up lamp portion of the lamp of FIG. 1.
Figure 3:
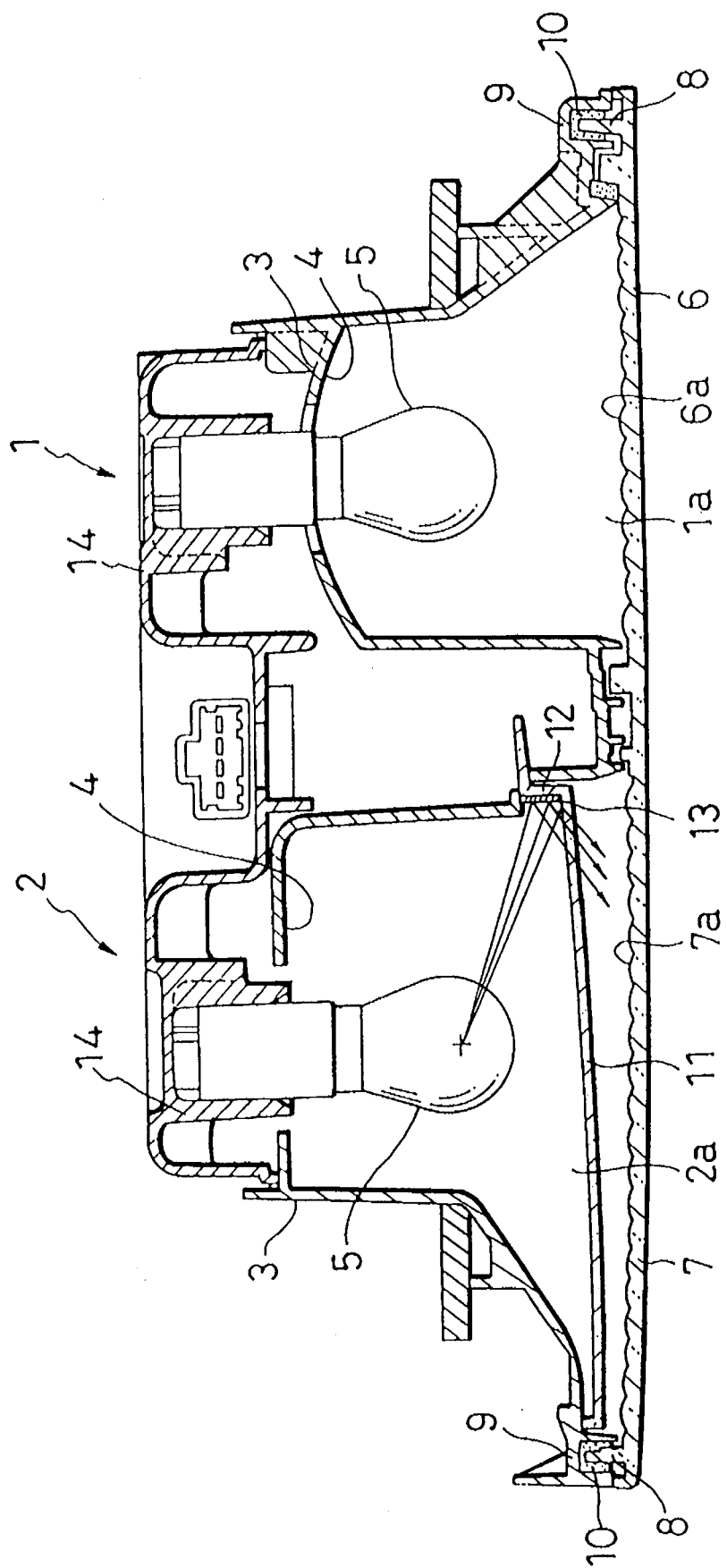
FIG. 3 is a sectional view showing the lamp of FIG. 1.
Figure 5:
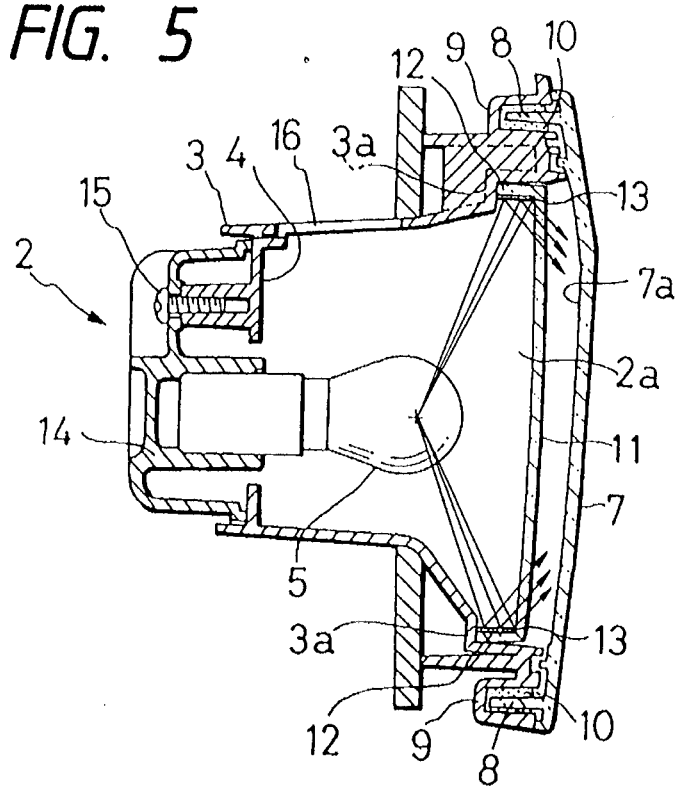
FIG. 5 is a longitudinal sectional view showing a tail and stop lamp for the lamp of FIG. 1.
Figure 6:
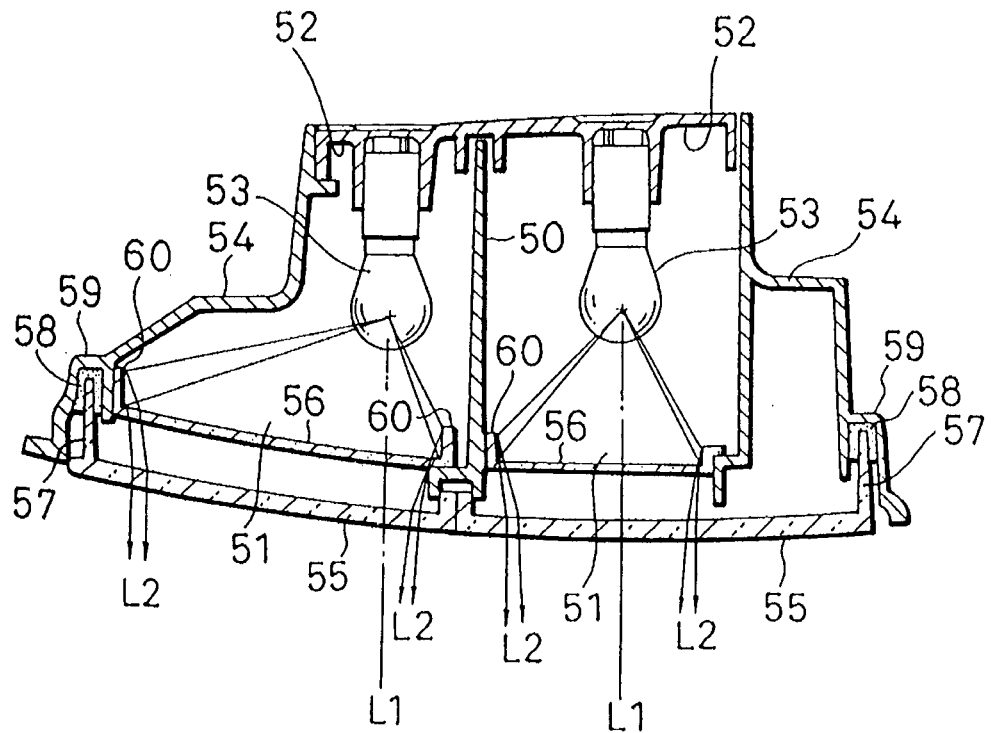
FIG. 6 is a sectional view showing conventional vehicular lamp.

A vehicular lamp constructed according to a preferred embodiment of the present invention will now be described with reference to FIGS. 1 to 5.

The lamp according to this embodiment is constructed as a so-called combination lamp wherein a back-up lamp 1 and a tail and stop lamp 2 are arranged in parallel in an integral form. Lamp chambers 1a and 2a are arranged parallel to one another in an integral unit to form a housing 3 of the lamp. In each of the lamp chambers 1a and 2a, a light bulb 5 is positioned in front of a reflector 4 provided at the rear portion of the lamp chamber. The reflector has a parabolic reflecting surface, an elliptic reflecting surface, or other reflecting structure in order to obtain a predetermined pattern of diffused light. Further, outer lenses 6 and 7 formed in an integral form are provided to cover front openings of the lamp chambers 1a and 2a. Peripheral portions of the outer lenses 6 and 7 are mated with peripheral edges of the front openings of the lamp chambers 1a and 1b, respectively, to tightly seal the lamp chambers 1a and 1b.

Diffusion lens steps 6a and 7a are formed on the inner surfaces of the outer lenses 6 and 7 in order to diffuse and distribute in predetermined patterns light emitted by the bulbs 5 mounted in the lamp chambers 1a and 2a, respectively. Seal leg portions 8 formed at the peripheries of the diffusion steps 6a and 7a are fitted into a seal groove 9 formed in the peripheral edge of the front opening of the lamp housing 3. The seal leg portions 8 are combined with the seal groove 9 in an integral form with the use of an adhesive 10.

Generally speaking, in accordance with the present invention, the outer lens 6 sealing the front opening of the lamp chamber la on the back-up lamp 1 side is formed as a white (transparent) synthetic resin product, and lens steps 6a are fabricated on the inner surface of the outer lens 6 so as to obtain the desired light distribution pattern.

The outer lens 7 sealing the front opening of the lamp chamber 2a on the side of the tail and stop lamp 2 is formed as a red synthetic resin product so as to be used as a signal lamp. Further, a clear lens 11 is mounted parallel to the outer lens 7 inside the outer lens 7. Lens steps 7a such as Fresnel steps are formed on the inner surface of the inner lens 11. A flange portion 12 projecting rearward within the lamp chamber 2a is formed on the peripheral edge of the inner lens 11. The rear end of this flange portion 12 abuts a stepped portion 3a (FIG. 5) of the lamp housing 3 projecting inside the lamp chamber 2, so that the inner lens 11 is fixed at a preselected mounting position within the lamp chamber 2a.

A diffusion/reflection layer 13 is formed on the inner and outer peripheral surfaces of the flange portion 12 of the inner lens 11 provided in the lamp chamber 2a of the tail and stop lamp 2. In general, the diffusion/reflection layer 13 is formed by performing convexo-concave forming processing, roughening processing, or by forming an irregular reflection coating plane on the entire inner/outer peripheral surfaces of the flange portion 12.

In this configuration, when light emitted by the bulb 5 in the lamp chamber 2a is transmitted through the flange portion 12 and further reflected by the inner wall plane of the lamp housing 3, this light is irregularly reflected by the flange portion 12 and the inner wall of the lamp housing 3. As a result, the reflected light is prevented from being emitted outside the outer lens 7 as a specifically converged light beam.

Consequently, no portion having a distinguishing contrast is seen on the surface of the outer lens 7 when the lamp is turned on.

The diffusion/reflection structure 13 need not always be formed at the flange portion 12 of the inner lens 11. That is, the diffusion/reflection structure 13 may be formed on the inner wall of the opening of the lamp housing 3 (particularly, on the side of the back-up lamp 2 or the like) on which the flange portion 12 is provided, the seal leg portion 8 of the outer lens 7, or the peripheral portion thereof, whereby the brightness of the front face of the outer lens 7 is can be maintained uniformly over the entire surface thereof.

It should be noted that the diffusion/reflection layer 13 of the present invention may also be formed on the front lens, the seal leg portion 8 of the outer lenses 6 and 7, or other lens or lamp portions which can perform the same effect.

The bulb 5 is supported by a bulb socket 14 detachably mounted on the rear end of the lamp housing 3. As a consequence, when replacing the bulb 5 or detaching/attaching the bulb socket 14, a plurality of screws 15 for fixing the bulb socket 14 to the rear end of the lamp housing 3 may need to be loosened so that the bulb socket 14 itself can be removed together with the bulb 5 from the rear end of the lamp housing 3.

In the side surface of the lamp housing 3 to which the bulb socket 14 is fitted, a grid-shaped air ventilation window 16 is formed on the side of the back-up lamp 1 and/or the tail and stop lamp 2 side. Such an air ventilation window 16 is employed so as to convey heat energy generated by the bulb 5 outside the lamp chambers 1a and 2a in a case where the optical outputs of the bulbs 5 housed within the lamp chambers 1a and 2a are large in comparison with the sizes of the lamp chambers 1a and 2a. Accordingly, the ventilation windows 16 assist in reducing the size of the lamp without decreasing its brightness.

Although in the above-described embodiment the present invention is described with reference to a combination lamp formed by the back-up lamp 1 and the tail and stop lamp 2, the invention is not limited to this combination and may be applied to other types of lamps without departing from the scope and spirit of the present invention.

With the lamp for an automobile according to the present invention, light reflected from the flange portions of the outer lens and the inner lens as well as light reflected from the inner wall of the opening portion of the lamp housing is diffused. Accordingly, the brightness of the outer lens or the front lens is maintained uniform over the entire surface thereof, so that the appearance of the lamp is greatly improved.

What is claimed is:

1. A lamp for an automobile, comprising:

a lamp housing including peripheral walls which define a chamber having a reflector means therein and a front opening;

a light source mounted in said chamber of said lamp housing;

lens means for diffusing light emitted from said light source, said lens means comprising flange means engaged at a periphery thereof with a front edge portion of said peripheral walls to thereby cover said front opening, said flange means being disposed inwardly of said front edge portion such that light emitted from said light source and passing through said flange means would impinge on said front edge portion;

diffusion/reflection means formed on said flange means of said lens means such that said light passing through said flange means and impinging on said front edge portion is irregularly reflected thereby.

2. The lamp according to claim 1, wherein said diffusion/reflection means is provided at an entire outer peripheral surface of said flange means.

3. The lamp according to claim 1, wherein said diffusion/reflection means is provided at a partial outer peripheral surface of said flange means.

4. The lamp according to claim 1, wherein said lens means comprises an outer lens and an inner lens.

5. A lamp for an automobile, comprising:

a lamp housing including peripheral walls which define a chamber having a reflector means therein and a front opening;

a light source mounted in said chamber of said lamp housing;

lens means for diffusing light emitted from said light source, said lens means comprising flange means engaged at a periphery thereof with a front edge portion of said peripheral walls to thereby cover said front opening, said flange means being disposed inwardly of said front edge portion such that light emitted from said light source and passing through said flange means would impinge on said front edge portion;

diffusion/reflection means formed on said flange means of said lens means such that said light passing through said flange means and impinging on said front edge portion is irregularly reflected thereby, wherein said lens means comprises an outer lens and an inner lens, and wherein said flange means comprises a flange portion projecting rearward within said lamp chamber formed on a peripheral edge of said inner lens, a rear end of said flange portion abutting a stepped portion of said lamp housing projecting inside said lamp chamber.

6. The lamp according to claim 1, wherein said diffusing means comprises a roughened surface.

7. The lamp according to claim 1, wherein said diffusing means comprises a diffusion/reflection layer including an irregular reflection coating provided on at least one of entire inner and outer peripheral surfaces of said flange means.

8. The lamp according to either one of claim 4, wherein said outer lens has diffusion lens steps formed on an inner surface thereof.

9. The lamp according to either one of claim 4, wherein said outer lens is formed by molding a white synthetic resin.

10. The lamp according to either one of claim 4, wherein said outer lens consists essentially of a red synthetic resin.

11. The lamp according to either one of claim 4, wherein said outer lens consists essentially of a yellow synthetic resin.

12. The lamp according to claim 4, wherein said inner lens consist essentially of a clear synthetic resin.

13. The lamp according to claim 4, wherein said inner lens comprises lens steps fabricated on an inner surface thereof.

14. The lamp according to claim 13, wherein said lens steps formed on said inner lens comprise Fresnel steps.

* * * * *